United States Patent [19]

Haferl

[11] Patent Number: 5,399,945
[45] Date of Patent: Mar. 21, 1995

[54] RASTER DISTORTION CORRECTION CIRCUIT

[75] Inventor: Peter E. Haferl, Adiswil, Switzerland

[73] Assignee: RCA Thomson Licensing Corporation, Princeton, N.J.

[21] Appl. No.: 70,818

[22] Filed: Jun. 3, 1993

[30] Foreign Application Priority Data

Jul. 28, 1992 [GB] United Kingdom ............... 9215993

[51] Int. Cl.⁶ .................... G09G 1/04; H01J 29/70
[52] U.S. Cl. ................................ 315/371; 315/408; 315/411
[58] Field of Search .................. 315/371, 408, 411

[56] References Cited

U.S. PATENT DOCUMENTS

| | | | |
|---|---|---|---|
| 4,206,388 | 6/1980 | Ishigaki et al. | 315/371 |
| 4,254,365 | 3/1981 | Knight | 315/371 |
| 4,429,257 | 1/1984 | Haferl | 315/371 |
| 4,634,937 | 1/1987 | Haferl | 315/371 |
| 4,890,043 | 12/1989 | Davie | 315/408 |
| 4,906,902 | 3/1990 | Haferl | 315/371 |
| 5,115,171 | 5/1992 | Haferl | 315/371 |

Primary Examiner—Gregory C. Issing
Attorney, Agent, or Firm—Joseph S. Tripoli; Joseph J. Laks; Sammy S. Henig

[57] ABSTRACT

An East-West switching transistor is coupled between a flyback transformer primary winding and a horizontal deflection output transistor circuit to control retrace energy to obtain an East-West modulation of the deflection current amplitude as required for East-West pincushion raster correction. The East-West switching transistor isolates a retrace resonant circuit that includes a horizontal deflection winding from a flyback resonant circuit that includes the flyback transformer during a portion of retrace. The deflection winding is coupled to a common conductor to permit the use of a retrace voltage sample, developed in the deflection winding and coupled to the East-West switching transistor, to control the switching operation in a manner that by-passes the flyback transformer. A resistor coupled in series with the primary winding develops a voltage, during trace, that is indicative of beam current. The resistor voltage is coupled to the East-West switching transistor to prevent beam current variation from causing raster width variation.

20 Claims, 3 Drawing Sheets

RASTER DISTORTION CORRECTION CIRCUIT

The invention relates to a deflection circuit of a video display apparatus.

A horizontal deflection circuit is, typically, required to be accurately phased or synchronized to a video signal containing picture information for obtaining a correct raster display. In common practice, a retrace pulse pranced in a flyback transformer of the deflection circuit is employed for providing a feedback pulse in a phase-controlled-loop to achieve such synchronization. However, when an ultor supply is energized by the flyback transformer, beam current variations may modulate a shape and a width of the transformer produced retrace pulse. Disadvantageously, the phase of a horizontal deflection current in a horizontal deflection winding may be offset or phase-shifted relative to that of the flyback transformer produced flyback pulse. The result may be an inaccurate synchronization causing a visible, beam current dependent, horizontal picture shift or a raster bending in a horizontal direction. Undesired raster distortion may be further caused when switched East*West (E-W) pincushion raster distortion correction circuit that employs the flyback pulse for switching purposes is utilized.

It may be desirable, instead of using the transformer produced retrace pulse, to use a retrace pulse developed in the horizontal deflection winding for the phasing of the deflection circuit to the video signal and for controlling the E-W pincushion raster distortion correction circuit. To that end, it may be desirable to have an end terminal of the horizontal deflection winding at a common conductor or ground potential, during retrace.

In a horizontal deflation circuit described in U.S. Pat. No. 5,115,171 (The Haferl Pat.), one end terminal of the horizontal deflection winding is coupled to ground potential. A loose coupling is provided between the flyback transformer and a retrace resonant circuit that includes the deflection winding. The grounded terminal of the deflection winding permits a more accurate phasing of the horizontal deflection winding retrace pulse to the video signal. The loose coupling reduces beam current dependent phase modulation of the horizontal deflection current and also reduces generation of so-called "mouseteeth" type raster distortion. In the Haferl Pat., the flyback transformer includes a third winding for generating a flyback pulse that controls the E-W raster distortion correction circuit.

It may be desirable to utilize a flyback transformer without such third winding so that a standard flyback transformer can be utilized. It may also be desirable to use a retrace voltage produced in the deflection winding instead of a flyback transformer pulse for controlling the East-West raster distortion circuit in order to make the circuit less susceptible to beam current load variations. Furthermore, it may also be desirable to provide breathing compensation that varies the deflection current amplitude according the flyback transformer beam current loading for maintaining constant picture width.

A television deflection apparatus, embodying an aspect of the invention, includes a source of a first switching signal at a frequency that is related to a first deflection frequency. A retrace resonant circuit, includes a deflection winding and a first retrace capacitance. A source of an input supply voltage is coupled to a supply inductance. A flyback pulse voltage is developed in the supply inductance. First switching arrangement is responsive to the first switching signal and coupled to the retrace resonant circuit for generating a deflection current in the deflection winding and a first retrace pulse voltage in the retrace resonant circuit, during a retrace interval of a given deflection cycle. A second switching arrangement is responsive to a modulation signal and to the first retrace pulse voltage and coupled to the supply inductance and to the retrace resonant circuit for coupling the supply inductance to the retrace resonant circuit to replenish energy losses in the retrace resonant circuit. The second switching arrangement decouples the supply inductance from the retrace resonant circuit, during a controllable first portion of said the retrace pulse voltage that is determined in accordance with the modulation signal and the first retrace pulse voltage. The first retrace pulse voltage is coupled to a control terminal of the second switching arrangement via a signal path that bypasses the supply inductance.

Figure 1:
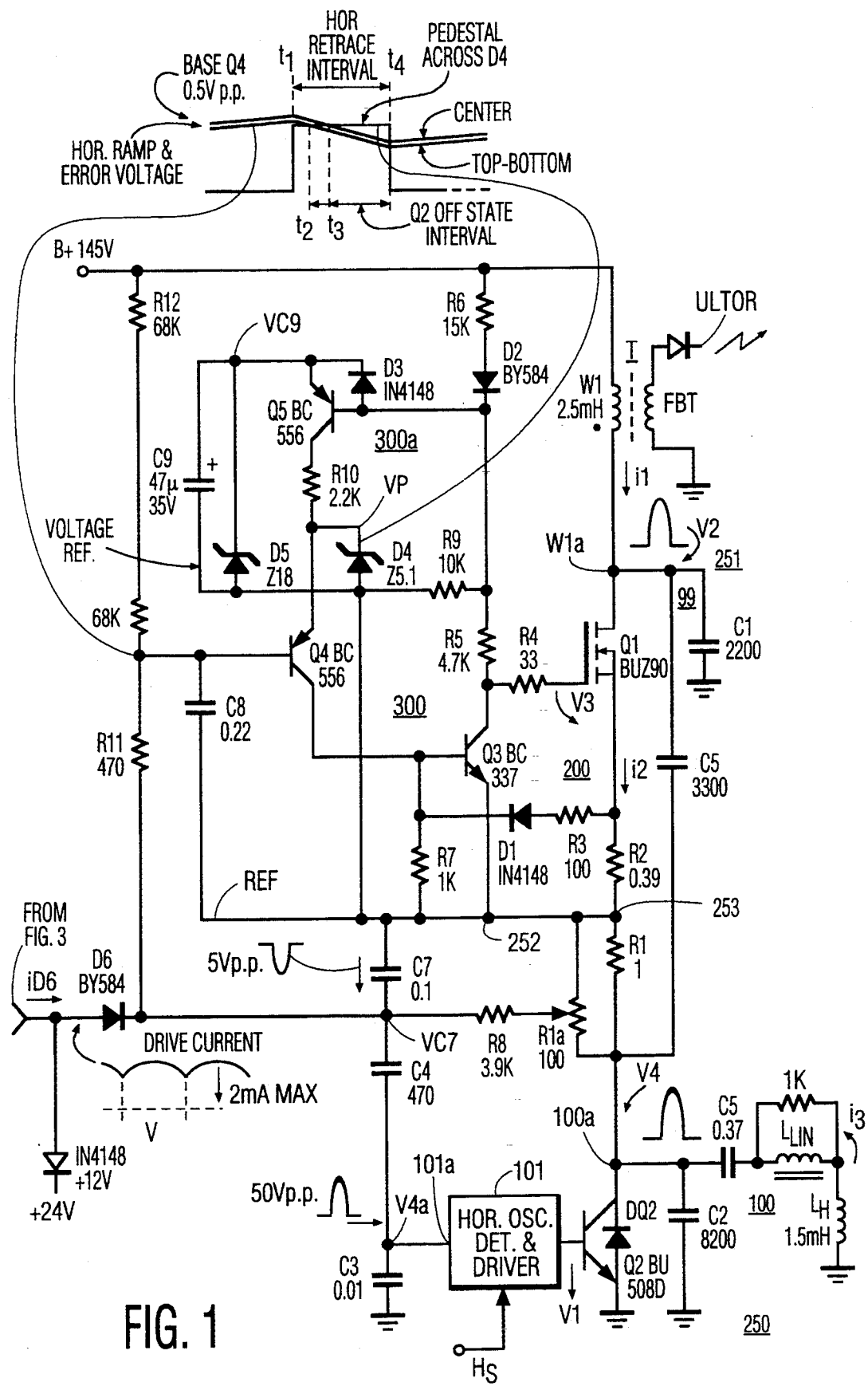
FIG. 1 illustrates a deflection circuit embodying an aspect of the invention that includes pincushion correction arrangement.

A horizontal deflection circuit 250 of FIG. 1 provides horizontal deflection in, for example, a color cathode ray tube (CRT) type VIDEOCOLOR A59ECY13X31. Circuit 250 includes a switching transistor Q2 operating at a horizontal frequency $f_H$ that is about 15,625 KHz in the PAL standard and an anti-parallel damper diode DQ2. A retrace capacitor C2 is coupled in parallel with transistor Q2 and diode DQ2. A deflection winding $L_H$ is coupled in series with an S-shaping or trace capacitance $C_S$ and with a linearity inductance $L_{LIN}$, forming a circuit branch that is coupled in parallel with each of transistor Q2, diode DQ2 and retrace capacitor C2, to form a retrace resonant circuit 100, during horizontal retrace.

A phase control stage 101 that includes a horizontal oscillator and a phase detector, not shown in detail in FIG. 1, is responsive to a horizontal synchronizing signal $H_S$. Signal $H_S$ is derived from, for example, a video detector of a television receiver, not shown in the FIGURES and is referenced to a common conductor or ground potential. A retrace voltage V4 in capacitor C2 is coupled via a capacitor C7 and capacitors C4 and C3 forming a capacitive voltage divider to obtain a sample, low amplitude retrace voltage V4a that is referenced to the common conductor or ground. Voltage V4a is applied to a second input 101a of stage 101 to synchronize retrace pulse voltage V4 to synchronizing signal $H_S$. Stage 101 applies, via a conventional driver stage, not shown, a switching voltage V1 to the base-emitter junction of transistor Q2 for producing a base drive current at the horizontal frequency $f_H$. Voltage V1 is also referenced to the common conductor or ground potential.

A raster distortion correction circuit 200, includes an E-W control circuit 300 that controls switching timing of an MOS, switching transistor Q1 of a flyback circuit 251, during retrace. A primary winding W1 of a flyback transformer T1 of circuit 251 is coupled between a source of a B+ voltage and a drain electrode of switching transistor Q1. A flyback capacitor C1 is coupled to a junction terminal W1a, between transistor Q1 and winding W1, to form with winding W1 a flyback resonant circuit 99 of circuit 251. The source electrode of transistor Q1 is coupled via a series arrangement of a current sampling resistor R1 and a current sampling resistor R2 to the collector of transistor Q2 of circuit 250.

Resonant circuits 99 and 100 are parallel coupled by transistor Q1, during a controllable portion of the retrace interval to supply energy to deflection circuit 250. Resonant circuits 99 and 100 have the same resonant frequency, 44 KHz. Therefore, when resonant circuits 99 and 100 are coupled in parallel the resulting resonant frequency of circuit 100 does not change. A capacitor C5 provides loose coupling between resonant circuits 99 and 100 when transistor Q1 is nonconductive.

Figure 2:
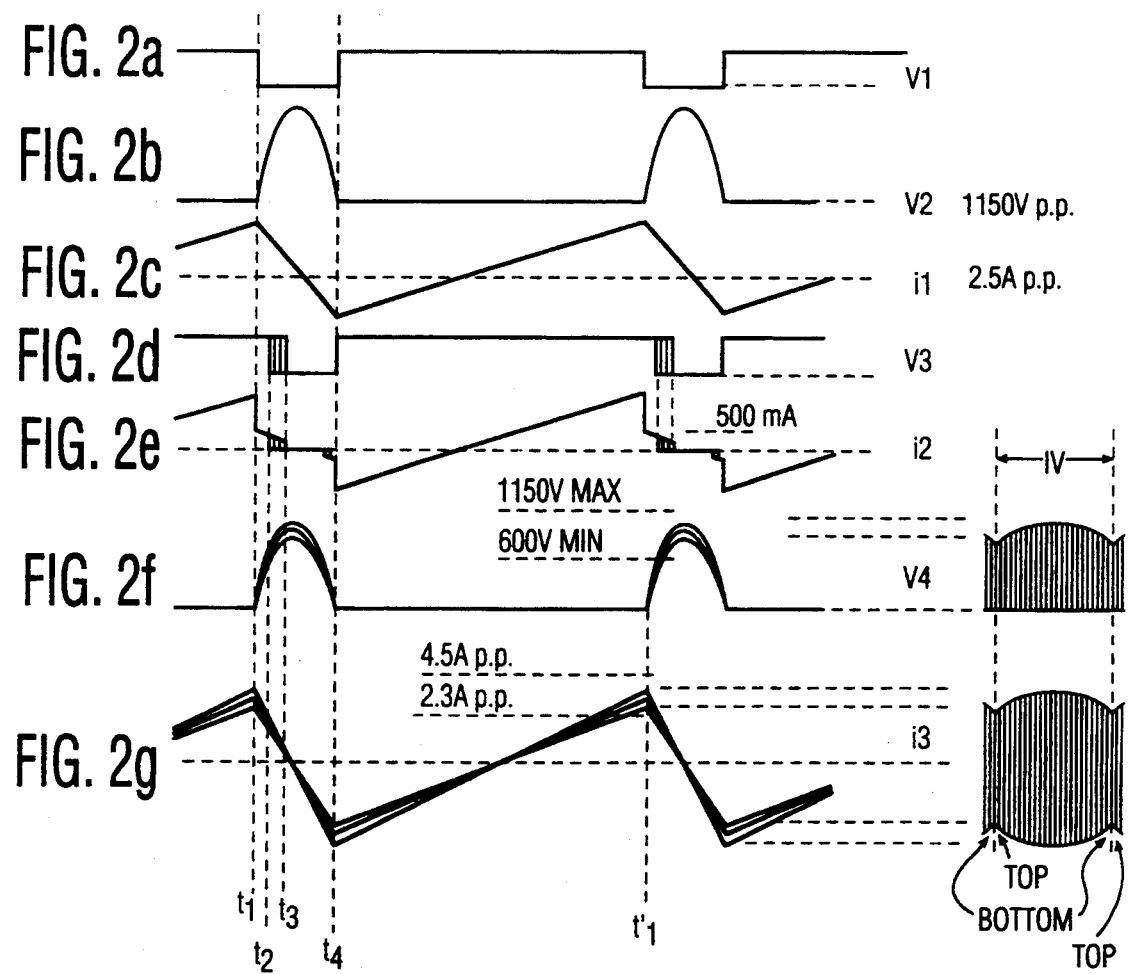
FIGS. 2a–2g illustrate waveforms useful in explaining the operation of the circuit of FIG. 1.

FIGS. 2a-2g illustrate waveforms useful for explaining the operation of the circuit of FIG. 1. Similar symbols and numerals in FIGS. 1 and 2a-2g indicate similar items or functions. Transistors Q1 and Q2 of FIG. 1 are conductive during a trace interval, t4-t1', as illustrated by waveforms of FIGS. 2a and 2d showing drive voltages V1 and V3, respectively. An upramping trace portion of a current i1 of FIG. 2c flows through series coupled transistors Q1 and Q2 of FIG. 1 to ground. Deflection current i3 of FIG. 2g flows through transistor Q2 of FIG. 1 to ground. Negative portions of currents i1 and i3 flow through integrated diode DQ2 and an integrated diode, not shown, of transistor Q1.

Deflection transistor Q2 is turned off at time t1 of FIG. 2a to initiate a retrace interval t1-t4. Current i3 of FIG. 1 flows then through capacitor C2 to produce retrace voltage V4, as shown in FIG. 2f. Voltage V4 in capacitor C2 is coupled to E-W control circuit 300 via capacitor C7 and resistor R11 of FIG. 1. E-W control circuit 300 of FIG. 1 generates a drive voltage V3 at the gate of transistor Q1 to turn off transistor Q1 at a controllable instant that occurs during a portion of the retrace interval, interval t2-t3 of FIG. 2d, as explained later on. The amplitude of a flyback voltage V2 developed at the drain of transistor Q1 and having a waveform of FIG. 2b is regulated or stabilized by supply voltage B+ of FIG. 1 and is independent of variations in the state of conduction, of transistor Q1, during retrace. From time t1 of FIG. 2e until transistor Q1 of FIG. 1 is turned off, current i2 in transistor Q1 replenishes energy losses in resonant circuit 100.

Flyback current i1 in winding W1 is split into a first portion, current i2, of FIG. 2e, having a small amplitude, flowing through transistor Q1 of FIG. 1 to resonant circuit 100. The remaining portion of current i1 flows through capacitors C1 and C5. The duration of the flow of current i2 is modulated by the operation of transistor Q1 to obtain amplitude modulation at vertical rate of parabolic shaped envelope of retrace voltage V4 and of deflection current i3. The amplitude modulation is required for correction of E-W raster distortion, as shown in the waveforms of FIGS. 2f and 2g at the right-hand side.

Figure 3:
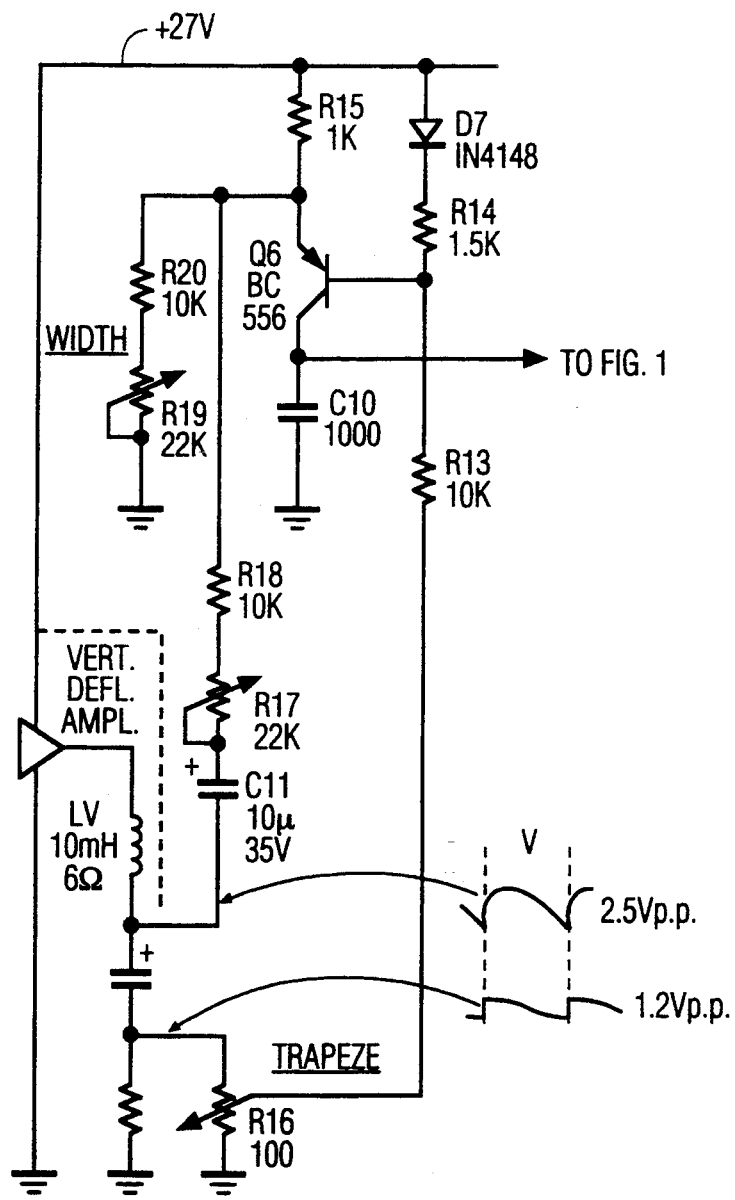
FIG. 3 illustrates a vertical deflection circuit for generating a vertical rate parabolic current that provides East-West raster distortion correction in the arrangement of FIG. 1.

From top toward the center of the raster, the turn-off instant of transistor Q1 of FIG. 1 is increasingly delayed, from time t2 to time t3 of FIG. 2d by a vertical parabola current iD6 that is generated in a vertical deflection circuit of FIG. 3. This causes current i2 of FIG. 1 to flow during an increasing time interval into deflection circuit 250 to produce increasing amplitudes of retrace voltage V4 and of deflection current i3 of FIGS. 2f and 2g, respectively. From the center to the bottom of the raster, the turn-off instant of transistor Q1 is increasingly advanced from time t3 to time t2 of FIG. 2d. As a result, current i2 of FIG. 2e flows, during a decreasing time interval, into deflection circuit 250 of FIG. 1 causing decreasing amplitudes of voltage V4 and current i3. In this way beam positioning or East-West pincushion distortion error is corrected.

Control circuit 300 that includes a driver transistor Q3 is responsive to E-W modulating vertical parabola current iD6 coupled via a diode D6. A DC feedback path including resistors R8 and R11, a resistor R12 and capacitor C8 compares the average or DC value of retrace voltage V4 with the B+ voltage. An AC feedback path including a capacitive divider formed by capacitors C3, C4, C7 and C8 reduces a high frequency loop gain to avoid ringing at the top of the raster. E-W control circuit 300 further includes a pedestal generator transistor Q5 and a comparator transistor Q4 that controls driver transistor Q3.

A reference potential REF for circuit 300 is established in a conductor 252 that is coupled to a terminal 253 of resistor R1 remote from the collector of transistor Q2. During horizontal trace, reference potential REF is approximately at a ground potential developed in a ground conductor G, neglecting the sum of the small voltage drop in resistor R1 and the saturation voltage transistor Q2. During horizontal trace, a capacitor C9, having a terminal that is at the reference potential REF of circuit 300, is charged from the B+ voltage via a series arrangement of a resistor R6, a diode D2 and a diode D3. The voltage in capacitor C9 is limited to 18 volts by the operation of a Zener diode D5 that is coupled across capacitor C9. A charge current of capacitor C9 that flows in diode D3 maintains transistor Q5 nonconductive because the forward voltage of diode D3 reverse biases the base-emitter junction of transistor Q5. Therefore, no emitter current can flow in transistor Q4 from transistor Q5. Thus, transistor Q4 is also nonconductive. Transistor Q3 having a base that is driven by the collector current of transistor Q4 is also nonconductive. The collector voltage of transistor Q3 that is supplied via a resistor R5 is approximately equal to the voltage in capacitor C9, because transistor Q3 is nonconductive. The collector voltage of transistor Q3 that is coupled to the gate of transistor Q1 via a resistor R4 causes transistor Q1 to be conductive, throughout horizontal trace.

During trace, the B+ supply voltage produces a current in a resistor R12 that is coupled to a capacitor C8. Capacitor C8 is coupled between the base of transistor Q4 and reference potential REF in conductor 252. The current in resistor R12 also flows via resistor R1 and conductive transistor Q2. As a result of the current in resistor R12, an upramping base voltage of transistor Q4 is produced in capacitor C8 relative to reference potential REF. A positive trace voltage developed across capacitor C7, of the capacitive divider formed by capacitors C3, C4 and C7, is coupled via resistor R11 and capacitor C8 to enhance the up-ramping base voltage of transistor Q4. During retrace, the currents reverse in resistors R11 and R12, producing a downramping voltage across capacitor C8 and at the base of transistor Q4. As a result, a horizontal rate sawtooth voltage is developed at the base of transistor Q4 as illustrated in FIG. 1.

During retrace, retrace voltage V4 reverse biases diode D2. A current produced by a voltage VC9 in capacitor C9, flows in a resistor R9 that is coupled to the base of transistor Q5 and reverse biases diode D3, during retrace. Transistor Q5 is turned on and a pedestal voltage VP that is referenced to conductor 252 is developed across a Zener diode D4. Pedestal voltage VP is also developed at the emitter of comparator transistor Q4 and establishes a threshold voltage for comparator transistor Q4. At the beginning of retrace, the base voltage of transistor Q4 is larger than voltage VP. Therefore, transistor Q4 is nonconductive and transistor Q1 is conductive.

At a controllable instant during horizontal retrace, a cross-over occurs of the down-ramping base voltage of transistor Q4 with respect to threshold or pedestal voltage VP. The emitter-base voltage of transistor Q4 may be neglected for explanation purposes. When the cross-over occurs, transistor Q4 is turned on, causing transistor Q3 to turn on and transistor Q1 to turn off. The current that flows in resistor R5 and conductive transistor Q3 further increases the base current of transistor Q5 and, advantageously, speeds up the leading edge of voltage V3 at the gate of transistor Q1. Thus, the leading edge of voltage V3 is time-shifted in accordance with current iD6. Current iD6 is applied to capacitor C8 via diode D6, during trace. At the end of retrace, diodes D2 and D3 are again forward biased and transistors Q5, Q4 and Q3 are turned off regardless of the base voltage of transistor Q4 so as to maintain transistor Q1 conductive, during trace. Without current iD6, the voltage at the base of transistor Q4 is lower than the emitter voltage of transistor Q4.

Assume, hypothetically, that retrace voltage V4 increases above a normal operation level and becomes equal to flyback voltage V2. Because the average value of flyback voltage V2 is equal to the B+ voltage, in this case, the average value of voltage V4 is also equal to the B+ voltage. Therefore, the average current through resistor R12 is zero, the DC voltage across capacitor C8 is zero and the level of the ramp voltage at the base of transistor Q4 is approximately equal to the voltage reference in conductor 252. As a result, transistor Q1 is turned off at time t1, causing a decrease of voltage V4. Similarly, a low amplitude of voltage V4 causes a positive shift of the base voltage of transistor Q4 that tends to delay the turning off time of transistor Q1 and thereby to increase the amplitude of voltage V4. Thus, negative feedback that tends to stabilize voltage V4 is provided.

Parabolically shaped drive current iD6 charges capacitors C7 and C8 during trace for obtaining the desired raster correction and picture width. Diode D6 is cut off during retrace. Drive current iD6 is supplied from a collector current of a transistor Q6 and is unaffected by the forward voltage of diode D6 or by the saturation voltage of transistor Q2 or the voltage drop across current sampling resistor R1. The drive current exceeds the discharge current through resistor R8 to obtain maximum picture width. The feedback path via resistor R12 stabilizes the E-W raster correction circuit. The AC feedback via the capacitive divider formed by capacitors C3, C4 and C7 and resistor R11 prevents ringing.

In accordance with an aspect of the invention, signal transitions, during retrace, are supplied to control circuit 300 from retrace pulse voltage V4 produced in retrace resonant circuit 100 via a signal path that bypasses transformer T. The leading edge of voltage V4 is time-shifted or delayed to produce the leading edge of the base voltage of transistor Q3. The delay is obtained through capacitor C8 and is variable in accordance with current iD6.

Advantageously, circuit 100 is not loaded by beam current dependent load, during retrace. This is so, because transistor Q1 isolates resonant circuit 100 from flyback transformer T, during a portion of retrace. Whereas current i1 in transformer T replenishes energy losses in retrace resonant circuit 100, beam current loading does not load circuit 100. Therefore, advantageously, because transformer T is bypassed, variation at a fast rate of the phase and amplitude of retrace voltage V4 that could have been caused by beam current loading variations are prevented. It follows that control circuit 300, advantageously, does not introduce undesirable variations in deflection current i3 at a high rate that could have been caused by beam current loading variation.

Raster breathing caused by high voltage variations is compensated via a feedback path formed by resistor R1 in parallel with a resistor R1a, resistor R8 and resistor R11. Primary current i1 in winding W1 of transformer T is sampled across resistor R1 and the sampled voltage is voltage-divided by potentiometer resistor R1a. As a result, an increase of beam current causes an increased primary current i1 and, in turn, a larger negative average voltage across resistor R1. Consequently, the average discharge current through resistor R8 increases and reduces the base voltage of transistor Q4, and in turn, the picture width to compensate for the high or ultor voltage drop. Advantageously, sampling resistor R1 is coupled outside deflection circuit 250 and does not degrade the deflection linearity. The value of resistor R1 is adapted to the high voltage source impedance. The degree of compensation is adjusted by adjusting potentiometer resistor R1a.

Soft start-up characteristic is provided by capacitor C9 that is charged slowly via resistor R6, thus producing a slowly increasing gate voltage of transistor Q1 and in turn a controlled inrush current. Transistor Q1 is protected against overcurrents by current sampling resistor R2 and by resistor R3 and diode D1. Transistor Q1 is turned off when, as a result of excessive current, the voltage across resistor R2 exceeds the sum of the forward voltage of diode D1 and base-emitter voltage of transistor Q1. Thus, transistor Q1 is an avalanche-proof MOSFET transistor, that does not require additional over-voltage protection. Thus, transistor Q1 is self-protected against possible overvoltages.

Operation at a horizontal frequency of $2f_H$ is possible with few modifications. A primary inductance of winding W1 should preferably be about 0.8 mH. In the control circuits the values of capacitor C8, resistor R6 and resistor R5 should preferably be changed to 100 nF, 10 kΩ and 2.2 kΩ, respectively.

What is claimed is:
1. A television deflection apparatus, comprising:
a source of a first switching signal at a frequency that is related to a first deflection frequency;
a retrace resonant circuit, including a deflection winding and a first retrace capacitance;
a source of an input supply voltage;
a supply inductance coupled to said source of input supply voltage for developing a flyback pulse voltage in said supply inductance;
first switching means responsive to said first switching signal and coupled to said retrace resonant circuit for generating a deflection current in said deflection winding and a first retrace pulse voltage in said retrace resonant circuit, during a retrace interval of a given deflection cycle;

a source of a modulation signal; and second switching means responsive to said modulation signal and to said first retrace pulse voltage and coupled to said supply inductance and to said retrace resonant circuit for coupling said supply inductance to said retrace resonant circuit to replenish energy losses in said retrace resonant circuit, said second switching means decoupling said supply inductance from said retrace resonant circuit, during a controllable first portion of said first retrace pulse voltage that is determined in accordance with said modulation signal and said first retrace pulse voltage such that said retrace pulse voltage is coupled to a control terminal of said second switching means via a signal path that bypasses said supply inductance.

2. An apparatus according to claim 1 wherein a first main current conducting terminal of said second switching means is coupled to said supply inductance at a point remote from said retrace resonant circuit, and a second main current conducting terminal of said second switching means is coupled to said retrace resonant circuit at a point remote from said supply inductance.

3. An apparatus according to claim 1 wherein said second switching means forms, during said first portion, a high impedance that is interposed between said supply inductance and said retrace resonant circuit.

4. An apparatus according to claim 1 further comprising, a flyback capacitance coupled to said supply inductance to form a flyback resonant circuit that is coupled via said second switching means to said deflection winding during a second portion of said first retrace pulse voltage.

5. An apparatus according to claim 4 wherein said resonant circuits have, each, substantially equal resonance frequencies.

6. An apparatus according to claim 4 wherein a resonance frequency of a combined resonant circuit that includes said supply inductance, said deflection winding said first retrace capacitance and said flyback capacitance is substantially the same as that of said retrace resonant circuit, alone.

7. An apparatus according to claim 1 wherein said supply inductance comprises a primary winding of a flyback transformer, wherein said transformer is coupled to an ultor terminal forming a load with respect to said transformer that varies in accordance with a beam current variation and wherein said second switching means decouples said retrace resonant circuit from said load.

8. An apparatus according to claim 1 wherein said second switching means operates in a nonconductive state during said first portion of said first retrace pulse voltage and in a conductive state during a second portion of said first retrace pulse voltage.

9. An apparatus according to claim 8 wherein said first portion follows said second portion during a given retrace interval.

10. An apparatus according to claim 1 wherein said supply inductance comprises a winding of a flyback transformer that is decoupled from said retrace resonant circuit by said second switching means when said second switching means is nonconductive and that is coupled through said second switching means to said retrace resonant circuit when said second switching means is conductive.

11. An apparatus according to claim 1 further comprising, a phase-control-stage responsive to said first input signal and to a feedback retrace pulse voltage that is coupled from said retrace resonant circuit in a manner that bypasses said supply inductance.

12. An apparatus according to claim 1 wherein said second switching means is coupled in series with said first switching means during a trace portion of said given deflection cycle.

13. An apparatus according to claim 1 wherein each of said first and second switching means operates at a horizontal rate and wherein said second switching means becomes nonconductive, within said retrace interval, at an instant that varies in a vertical rate parabolic manner to provide pincushion distortion correction.

14. An apparatus according to claim 1 further comprising, means responsive to a signal at a vertical rate for producing a control signal at a control terminal of said second switching means such that a leading edge of said control signal varies in accordance with said vertical rate signal.

15. An apparatus according to claim 1 further comprising, a load circuit coupled to said supply inductance and energized by said flyback pulse voltage wherein said second switching means forms a high impedance that reduces mouseteeth distortions by reducing energy transfer from said retrace resonant circuit to said load circuit, during said retrace interval.

16. An apparatus according to claim 1 wherein said first and second switching means are coupled in series, during a portion of a trace interval of said deflection cycle and wherein said supply inductance, said second switching means and said retrace resonant circuit are coupled in series during a second portion of said first retrace pulse voltage.

17. An apparatus according to claim 1 wherein said second switching means decouples said first retrace pulse voltage from said supply inductance and said flyback pulse voltage from said retrace resonant circuit, during said controllable first portion of said retrace pulse voltage.

18. A television deflection apparatus, comprising:

a source of a first switching signal at a frequency that is related to a first deflection frequency;

a retrace resonant circuit, including a deflection winding and a first retrace capacitance;

a source of an input supply voltage;

a flyback transformer having a winding that is coupled to said source of input supply voltage for developing, during a retrace interval, a flyback pulse voltage in said transformer that is coupled to an ultor terminal, such that a current that is indicative of a beam current is generated in said winding, during a trace interval;

first switching means responsive to said first switching signal and coupled to said retrace resonant circuit for generating a deflection current in said deflection winding and for developing a first retrace pulse voltage in said retrace resonant circuit, during said retrace interval of a given deflection cycle;

second switching means responsive to a switching control signal and coupled to said winding of said transformer and to said retrace resonant circuit for decoupling said transformer winding from said retrace resonant circuit, during a controllable first portion of said first retrace pulse voltage; and means responsive to said current in said transformer winding that is generated during said trace interval for generating said switching control signal that varies during said retrace interval to vary an amplitude of said deflection current in accordance with said transformer winding trace current.

19. A deflection apparatus according to claim 18 wherein the variation of said deflection current compensates for a variation of an ultor voltage developed at said ultor terminal to prevent raster width variation.

20. A deflection apparatus with beam positioning error correction, comprising:

a source of a first input signal at a frequency that is related to a horizontal deflection frequency;

a retrace resonant circuit including a deflection winding and a retrace capacitance;

a first transistor switch responsive to said first input signal and coupled to said retrace resonant circuit for generating a horizontal deflection current in said deflection winding and a retrace pulse voltage in said retrace resonant circuit;

a flyback resonant circuit including a supply inductance for generating a flyback pulse voltage in said supply inductance;

a source of a second input signal at a frequency that is related to a vertical deflection frequency;

a second transistor switch, coupled in series with said first transistor switch during a trace interval of a given cycle of said horizontal deflection current, said second transistor switch coupling said resonant circuits during a first period of said deflection cycle and decoupling said resonant circuits during a second period of a retrace interval of said deflection cycle that varies in accordance with a control signal, such that during said second period, said flyback pulse voltage is developed at a first main current conducting terminal of said second transistor switch and said retrace pulse voltage is developed at a second main current conducting terminal of said second transistor switch; and means responsive to said retrace pulse voltage and to said second input signal for generating said control signal such that said control signal is obtained from said retrace pulse voltage by time-shifting a transition edge of said retrace pulse voltage via a signal path that excludes said supply inductance.

* * * * *